(12) United States Patent
Effenberger

(10) Patent No.: US 11,110,888 B2
(45) Date of Patent: Sep. 7, 2021

(54) BELT BUCKLE ASSEMBLY HAVING A BELT FORCE LIMITER AND METHOD FOR INSTALLING THE BELT BUCKLE ASSEMBLY

(71) Applicant: VOLKSWAGEN AKTIENGESELLSCHAFT, Wolfsburg (DE)

(72) Inventor: Witali Effenberger, Wendeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/907,704

(22) Filed: Jun. 22, 2020

(65) Prior Publication Data

US 2020/0317157 A1    Oct. 8, 2020

Related U.S. Application Data

(63) Continuation of application No. PCT/EP2018/086044, filed on Dec. 20, 2018.

(30) Foreign Application Priority Data

Dec. 20, 2017 (DE) .................... 10 2017 223 333.8

(51) Int. Cl.
    *B60R 22/28*      (2006.01)
    *B60R 22/18*      (2006.01)
    *B62D 65/14*      (2006.01)

(52) U.S. Cl.
    CPC ............ *B60R 22/28* (2013.01); *B60R 22/18* (2013.01); *B62D 65/14* (2013.01); *B60R 2022/1806* (2013.01); *B60R 2022/281* (2013.01)

(58) Field of Classification Search
    CPC ............ B62D 65/14; B60R 2022/1806; B60R 2022/281; B60R 22/22; B60R 22/28;
    (Continued)

(56) References Cited

U.S. PATENT DOCUMENTS

| | | |
|---|---|---|
| 3,829,122 A | 8/1974 | Bastide |
| 5,069,482 A | 12/1991 | Föhl |

(Continued)

FOREIGN PATENT DOCUMENTS

| | | |
|---|---|---|
| DE | 28 09 587 A1 | 9/1978 |
| DE | 39 33 721 A1 | 4/1991 |

(Continued)

*Primary Examiner* — James A English
*Assistant Examiner* — Caitlin Anne Miller
(74) *Attorney, Agent, or Firm* — Muncy, Geissler, Olds & Lowe, P.C.

(57) ABSTRACT

A seat belt buckle assembly for a motor vehicle, and also to a method for installing the seat belt buckle assembly, wherein the seat belt buckle assembly has at least one seat belt buckle, a linear belt force limiter in operative connection with the at least one seat belt buckle, and a fitting, via which fitting at least the seat belt force limiter is arranged to be body-mounted. Furthermore, the seat belt force limiter is arranged such that it can rotate on the fitting and is pivotable at least between an installation position and an operating position. To install the seat belt buckle assembly, the seat belt buckle assembly is body-mounted to the motor vehicle by the fitting in the installation position of the seat belt force limiter, and the seat belt force limiter is pivoted into the operating position after the mounting of the seat belt buckle assembly.

11 Claims, 4 Drawing Sheets

(58) Field of Classification Search
CPC .......... B60R 22/18; B60R 2021/01265; B60R 2021/01279
See application file for complete search history.

(56) References Cited

U.S. PATENT DOCUMENTS

| | | | | |
|---|---|---|---|---|
| 5,984,357 | A * | 11/1999 | Yasuda | ............... B60R 22/1955 |
| | | | | 280/806 |
| 6,312,057 | B1 * | 11/2001 | Feile | ....................... B60R 22/28 |
| | | | | 280/805 |
| 6,485,058 | B1 | 11/2002 | Kohlndorfer et al. | |
| 6,581,969 | B2 * | 6/2003 | Nishide | ................... B60R 22/22 |
| | | | | 280/801.1 |
| 6,669,234 | B2 | 12/2003 | Kohlndorfer et al. | |
| 7,370,721 | B2 * | 5/2008 | Zelmer | ................... B60R 22/03 |
| | | | | 180/269 |
| 7,530,600 | B2 * | 5/2009 | Di Grande | ............. B60R 22/02 |
| | | | | 24/684 |
| 7,614,660 | B2 | 11/2009 | Glinka et al. | |
| 8,844,667 | B2 * | 9/2014 | Odate | ..................... B60R 22/03 |
| | | | | 180/268 |
| 2004/0041390 | A1 | 3/2004 | Tomita | |
| 2019/0351866 | A1 * | 11/2019 | Betz | ........................ B60R 22/28 |
| 2020/0130636 | A1 * | 4/2020 | Moeker | ............... B60R 22/1952 |

FOREIGN PATENT DOCUMENTS

| | | |
|---|---|---|
| DE | 10 2004 041 810 A1 | 3/2006 |
| DE | 601 09 455 T2 | 4/2006 |
| DE | 10 2009 010 849 A1 | 9/2010 |
| DE | 10 2014 204 990 A1 | 9/2015 |
| DE | 10 2016 015 161 A1 | 5/2017 |
| GB | 2 327 919 A | 2/1999 |
| WO | WO 97/18971 A2 | 5/1997 |

* cited by examiner

BELT BUCKLE ASSEMBLY HAVING A BELT FORCE LIMITER AND METHOD FOR INSTALLING THE BELT BUCKLE ASSEMBLY

This nonprovisional application is a continuation of International Application No. PCT/EP2018/86044, which was filed on Dec. 20, 2018, and which claims priority to German Patent Application No. 10 2017 223 333 8, which was filed in Germany on Dec. 20, 2017, and which are both herein incorporated by reference.

BACKGROUND OF THE INVENTION

Field of the Invention

The present invention relates to a seat belt buckle assembly for a motor vehicle, and also to a method for installing the seat belt buckle assembly, wherein the assembly has at least one seat belt buckle, a linear belt force limiter in operative connection with the at least one seat belt buckle, and a fitting, and at least the seat belt force limiter is arranged to be body-mounted by means of the fitting.

Description of the Background Art

To avoid injuries caused to vehicle occupants during an accident by the action of the safety belt on the chest area of the vehicle occupant, modern safety restraint systems are equipped with seat belt force limiters, by which means the forces that act are reduced to a level that is biomechanically tolerable for the vehicle occupant.

Such seat belt force limiters can, for example, be implemented as torsion bars integrated into the seat belt retractor or arranged below the seat belt buckle, or else be installed as linear belt force limiters in the region of the seat belt buckles. In the latter case, the force acting on the seat belt buckle is introduced into the seat belt force limiter, in particular through a wire cable connection between the seat belt buckle and the seat belt force limiter, and at a least a portion of the energy corresponding to the force is intentionally released in the seat belt force limiter.

DE 10 2016 015 161 A1 is among the sources that show some designs of a seat belt force limiter of the type described in the preceding paragraph. In addition to a design based on a torsion bar, this disclosure includes multiple variants of linear belt force limiters that rely substantially on the deformation of parts of the seat belt force limiter for release of the energy introduced into the seat belt force limiter. The seat belt force limiters here are suitable for use for vehicle front seats and, in particular, for seats in the rear section of the vehicle, wherein the seat belt buckles in the rear section of the vehicle are recognizably designed in part as double seat belt buckles.

GB 2 327 919 A also describes a seat belt force limiter that is likewise based on deformation of internal parts, wherein the belt force acting on the vehicle occupants can be limited between two different levels in the case of this design.

The linear seat belt force limiters disclosed have in common that they have an elongated, in particular cylindrical, shape, and the length here is a necessity in order to release the force that is introduced or, respectively, the energy corresponding thereto.

However, during their installation, and in particular during their installation in conjunction with double seat belt buckles, the elongated shape of the linear belt force limiters can represent a design that complicates installation. For example, this is the case when an actual mounting point of the seat belt buckle and/or of the seat belt force limiter is inaccessible on account of its shape.

SUMMARY OF THE INVENTION

It is therefore an object of the present invention to provide a seat belt buckle assembly so as to ensure simple installation of the seat belt buckle assembly together with a space-saving design of the seat belt buckle assembly. The object of the invention is also to provide a method for installing such a seat belt buckle assembly.

According to an exemplary embodiment of the invention, a seat belt buckle assembly for a motor vehicle is provided, wherein the seat belt buckle assembly has at least one seat belt buckle, a linear belt force limiter in operative connection with the at least one seat belt buckle, and a fitting, and at least the seat belt force limiter is arranged to be body-mounted by means of the fitting. In addition to the seat belt force limiter, moreover, the at least one seat belt buckle, and here, in particular, two seat belt buckles in the form of a double seat belt buckle arrangement, should also be body-mounted by means of the fitting. Moreover, the seat belt force limiter is arranged according to the invention such that it can pivot on, and in particular relative to, the fitting, which can also be regarded as a mounting frame, and can rotate at least between an installation position and an operating position. The pivoting design of the seat belt force limiter advantageously has the result that the installation of the seat belt buckle assembly is simplified, and furthermore an extremely optimal utilization of space can be ensured.

The linear belt force limiter is designed to be essentially elongated and cylindrical in shape, and consists of at least a deforming deformation element and a formable body that has a hollow cylindrical design and is to be deformed by the deformation element. The deformation element in this design shall be in operative connection with the seat belt buckle, e.g., through at least one tensioner, in particular a traction cable, wherein the one or more tensioner can be supported and/or guided by one or more bearings and/or guides. In one advantageously simple embodiment, the one or more tensioner can be guided and/or supported by a guide pulley or even multiple guide pulleys. On account of the hollow cylindrical design of the formable element, the deformation element executes an essentially linear motion when deforming the formable element, which characterizes the nature of the linear belt force limiter. In addition, the linear belt force limiter shall have fasteners for arrangement on the fitting, and/or can have a housing that at least partially encloses the seat belt force limiter.

The energy that is transmitted, for example during an accident, from the vehicle occupant through the safety belt and the latch plate, which is movably arranged on the safety belt, to the seat belt buckle that is attached to the latch plate, and is transmitted from the seat belt buckle to the seat belt force limiter by means of tensioner, is converted substantially by deformation of the seat belt force limiter, which is to say by conversion into mechanical work, as well as conversion into thermal energy.

The particular orientation of the seat belt force limiter in its installation position and in its operating position should be designed such that a longitudinal axis of the seat belt force limiter in the installation position is substantially perpendicular to this longitudinal axis of the seat belt force limiter in the operating position. However, it is likewise possible for the angle between the longitudinal axis in the installation position and the longitudinal axis in the operating position to be in an angular range between 70 degrees to 110 degrees.

In an extremely advantageous improvement of the invention, the seat belt buckle assembly has a retainer and/or a retainer assembly by means of which the seat belt force limiter is or can be removably secured in the installation position. By means of the retainer and/or the retainer assembly it is possible to secure the seat belt force limiter in the installation position, in particular during the installation of the seat belt buckle assembly. Consequently, it would not be necessary to hold the seat belt force limiter in the installation position by hand or through an automated robotic process during installation, for example by the installer performing the installation. A frictional and/or interlocking securing of the seat belt force limiter should be present in a pivoting direction of the seat belt force limiter, which is to say perpendicular to a pivot axis.

Furthermore, an embodiment of the invention proves to be especially beneficial when the retainer and/or the retainer assembly is partially or completely removable. On the basis of such a design of the invention, it is possible for the retainer and/or the retainer assembly to remain on the seat belt buckle assembly only until the installation thereof is completed, wherein the retainer and/or the retainer assembly can partially remain, however. Removal offers the advantage, for example, that the retainer and/or the retainer assembly does not have a disruptive influence on production steps that follow installation of the seat belt buckle assembly, and the available space can be utilized optimally.

An embodiment of the seat belt buckle assembly according to the invention that is additionally advantageous is based on the idea that the retainer assembly is realized through formations implemented in the seat belt force limiter, in a housing of the seat belt force limiter, and/or in the fitting, wherein the formations interact in a securing manner with one another or with parts of the fitting or of the housing of the seat belt force limiter. In this design, the formations can be implemented, for example, as projections and/or indentations made in the seat belt force limiter, in particular in the housing of the seat belt force limiter, and in the fitting. It is possible here that the relevant formations are produced by means of stamping, for example. In addition to downstream manufacturing processes such as a stamping of the formations, it is also possible that these formations are made in the seat belt force limiter, in particular the housing of the seat belt force limiter and/or the fitting, as early as the manufacturing thereof, for example by deep-drawing processes.

If, moreover, the retainer is a bracket that can be removed nondestructively or at least partially destructively, then this constitutes, in particular, an advantageous, structurally simple design of the retainer that can also be implemented economically. It would be advantageous here if the bracket is made of a plastic. In this context, a breakaway plastic bracket or plastic clip is possible. The bracket, for example in the form of the plastic bracket or clip, can accordingly be removed completely from the seat belt buckle assembly, or else a part of the bracket remains on or in the seat belt buckle assembly. To remove the bracket in an especially simple way, the bracket can have one or even several predetermined breaking points.

In another practice-oriented embodiment of the invention, at least one fastener for body-mounted connection of the fixture in the installation position of the seat belt force limiter is accessible for installation with or without tools, wherein the at least one fastener is correspondingly inaccessible for installation with or without tools in the operating position of the seat belt force limiter. Especially in the case of installation with tools, this installation is simplified considerably due to the accessibility of the at least one fastener, and a compact seat belt buckle assembly is made possible. In an especially advantageous embodiment, all fastener for body-mounted connection of the seat belt buckle assembly are accessible in the installation position of the seat belt force limiter. Accordingly, in this design the fastener would be inaccessible in the operating position of the seat belt force limiter.

Moreover, a promising embodiment of the invention is characterized in that the seat belt buckle assembly has at least one lock through which means the seat belt force limiter is secured against pivoting in the operating position. This achieves the result that the function of the seat belt force limiter, which is to say the release of the energy introduced into the seat belt force limiter, can be ensured unrestrictedly, and no restrictions caused by a continuing ability of the seat belt force limiter to pivot are to be expected after installation of the seat belt buckle assembly. The securing component must be designed here such that it can absorb at least the forces that act on the seat belt force limiter perpendicularly to the pivot axis and away from the operating position, and pivoting out of the operating position is prevented as a result.

The second-mentioned object is attained by means of a method according to the features of claim 8 for installing a seat belt buckle assembly. The claims dependent thereon concern especially useful improvements to the invention.

According to the invention, therefore, a method for installing a seat belt buckle assembly is further provided, in which the seat belt buckle assembly is body-mounted to the motor vehicle by means of the fitting in the installation position of the seat belt force limiter, and the seat belt force limiter is pivoted into the operating position after the mounting of the seat belt buckle assembly. The body-mounting of the fitting itself is advantageously accomplished by means of the at least one, in particular removable, fastener. During installation, therefore, the seat belt force limiter is beneficially positioned in the installation position, as a result of which a simple installation of the seat belt buckle assembly can be made possible on account of the accessibility of the one or more fastener of the seat belt buckle assembly. After the installation of the seat belt buckle assembly, the seat belt force limiter is pivoted into its operating position, as a result of which the seat belt force limiter can perform its actual function.

An especially advantageous improvement of the method according to the invention exists when the retainer and/or the retainer assembly automatically detaches or is at least partially removed due to the pivoting of the seat belt force limiter out of the installation position, or the retainer and/or the retainer assembly is detached or at least partially removed before the seat belt force limiter is pivoted out of the installation position. Installation is simplified and required installation time is reduced by an automatic detachment of the retainer and/or the retainer assembly, since no additional detachment of the retainer and/or of the retainer assembly is needed. Removal of the retainer and/or of the retainer assembly itself optimizes the available space for, e.g., subsequent manufacturing processes.

In addition, if the seat belt force limiter is secured in the operating position after being pivoted thereto, this should be considered beneficial in that the seat belt force limiter is secured in the operating position against being pivoted out of that position, and the function of the seat belt force limiter can be ensured accordingly.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
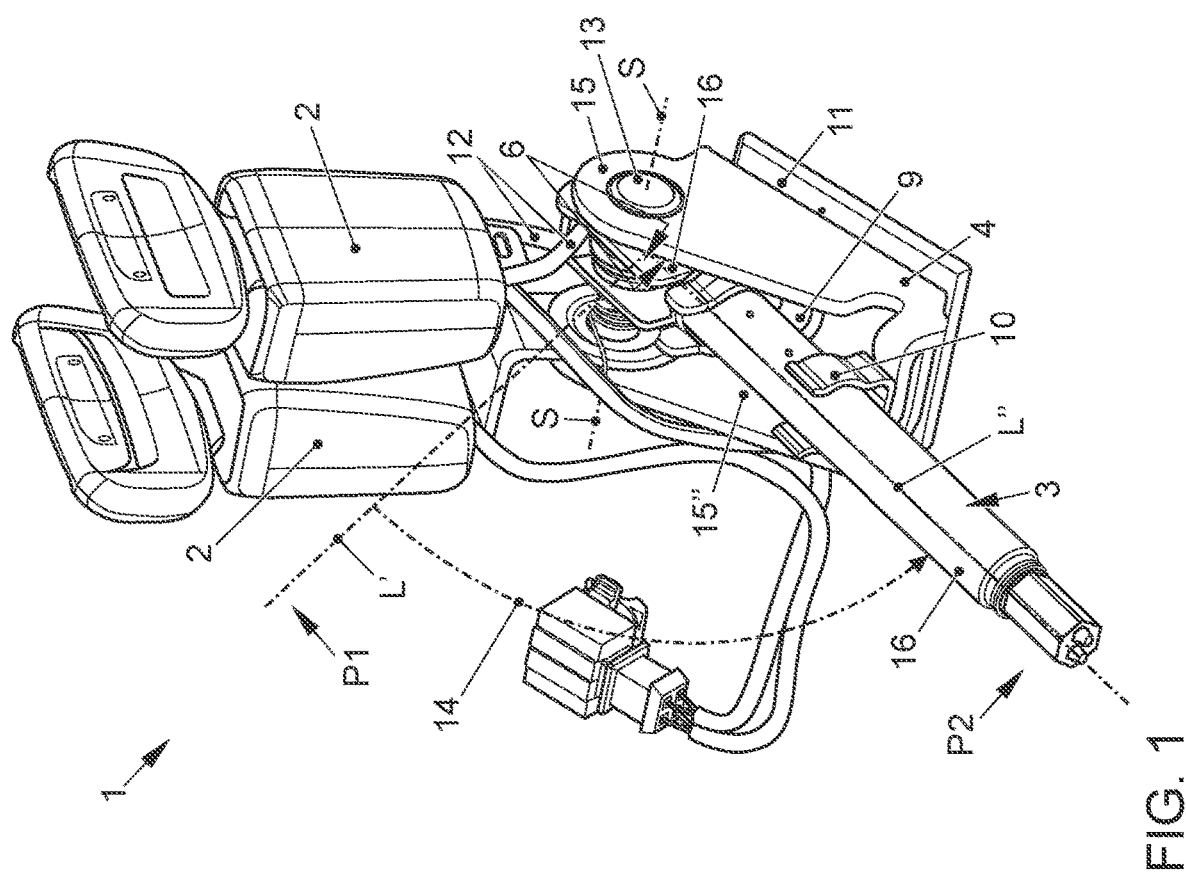
FIG. 1 illustrates a seat belt buckle assembly according to the invention.

FIG. 1 shows one embodiment of the seat belt buckle assembly 1 according to the invention. The seat belt buckle assembly 1 here has two seat belt buckles 2 and a linear belt force limiter 3 that is in operative connection with one of the seat belt buckles 2, in FIG. 1 the right-hand seat belt buckle 2, through the tensioner 12. In addition, the seat belt buckle assembly 1 has the fitting 4, by means of which the seat belt force limiter 3 and the seat belt buckles 2 are arranged to be body-mounted on the vehicle body 11. The seat belt force limiter 3 is additionally arranged such that it can rotate on the fitting 4 by means of the bolt 13. The seat belt force limiter 3 here can pivot between the installation position P1, represented in FIG. 1 by the longitudinal axis L' of the seat belt force limiter 3, and the operating position P2, wherein the seat belt force limiter is shown in just this operating position P2 in FIG. 1, and this is additionally indicated by the longitudinal axis L" of the seat belt force limiter 3. The pivoting of the seat belt force limiter 3 that takes place during the installation process of the seat belt buckle assembly 1 is indicated by the arrow 14. Prior to the pivoting of the seat belt force limiter 3, here perpendicular to the pivot axis S that passes through the bolt 13, the seat belt buckle assembly 1 is body-mounted by means of the fastener 9, which in this embodiment of the seat belt buckle assembly 1 is implemented as a screw, wherein the fastener 9 is accessible in the installation position P1 for installation with and/or without tools. In contrast, this is not the case in the operating position P2 that is shown of the seat belt force limiter 3, as can be seen in FIG. 1, since the fastener 9 is covered by the seat belt force limiter 3 and by the fitting 4, in particular by the fitting walls 15', 15", which extend orthogonally to and from the fitting base plate, are essentially V-shaped in design, and are spaced apart from one another in the height and width of the fitting base plate. This procedure during installation permits an extremely compact design and arrangement of the seat belt buckle assembly, since it is not necessary to provide any anchoring options, for example in the form of tabs, that extend outward from the fitting 4. The inner surface of the fitting wall 15' of the fitting 4 that faces the seat belt force limiter 3 additionally represents a part of the retainer assembly 6 in this embodiment. The second part of the retainer assembly 6 is formed by the outer surface of the housing wall 16 of the housing 7 of the seat belt force limiter 3 that faces the inner surface of the fitting wall 15'. On account of a tight tolerance that is present between the inner surface of the fitting wall 15' and the outer surface of the housing wall 16, for example in the form of an interference fit or press fit, a frictional connection exists between the seat belt force limiter 3 and the fitting 4 in the pivoting direction, which is to say perpendicular to the pivot axis S, by which means the seat belt force limiter 3 can be suitably secured in the installation position P1 by the retainer assembly 6. To pivot the seat belt force limiter 3 into the operating position P2, the frictional connection between the seat belt force limiter 3 and the fitting 4 is overcome by the application of a force to the seat belt force limiter 3 in the pivoting direction. In the embodiment shown in FIG. 1, the seat belt buckle assembly 1 additionally has a lock 10 designed as a retaining clip, by means of which the seat belt force limiter 3 is secured in the operating position P2 against pivoting. The securing in the operating position accordingly takes place after the pivoting of the seat belt force limiter 3 into its operating position P2.

Figure 2:
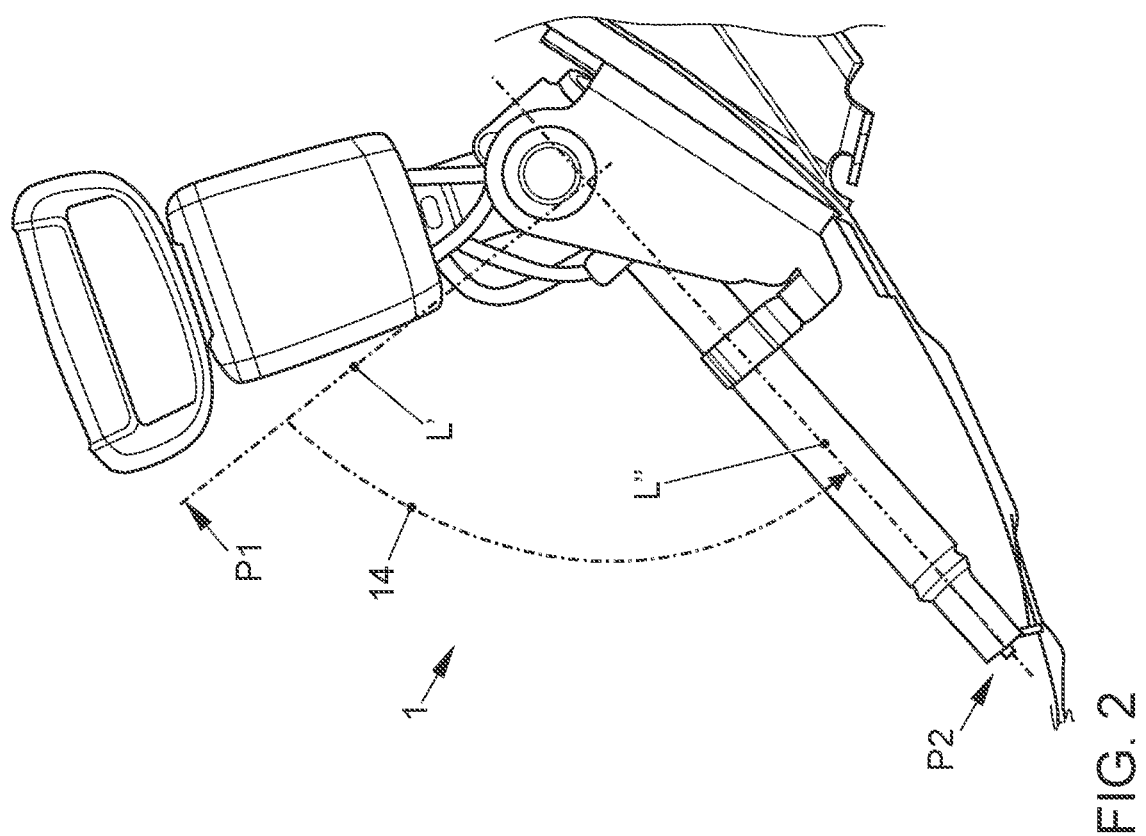
FIG. 2 illustrates a side view of a seat belt buckle assembly according to the invention.

FIG. 2 shows a side view of the embodiment of the seat belt buckle assembly 1 shown in FIG. 1. Illustrated here again for clarity are the positions P1, P2 of the seat belt force limiter 3, wherein the installation position P1 is again illustrated by the longitudinal axis L' of the seat belt force limiter 3 and the operating position P2 is illustrated by the longitudinal axis L" and by the seat belt force limiter 3 itself. In this side view from FIG. 2, an essentially perpendicular orientation of the installation position P1 and the operating position P2 can also be seen clearly.

Figure 3:
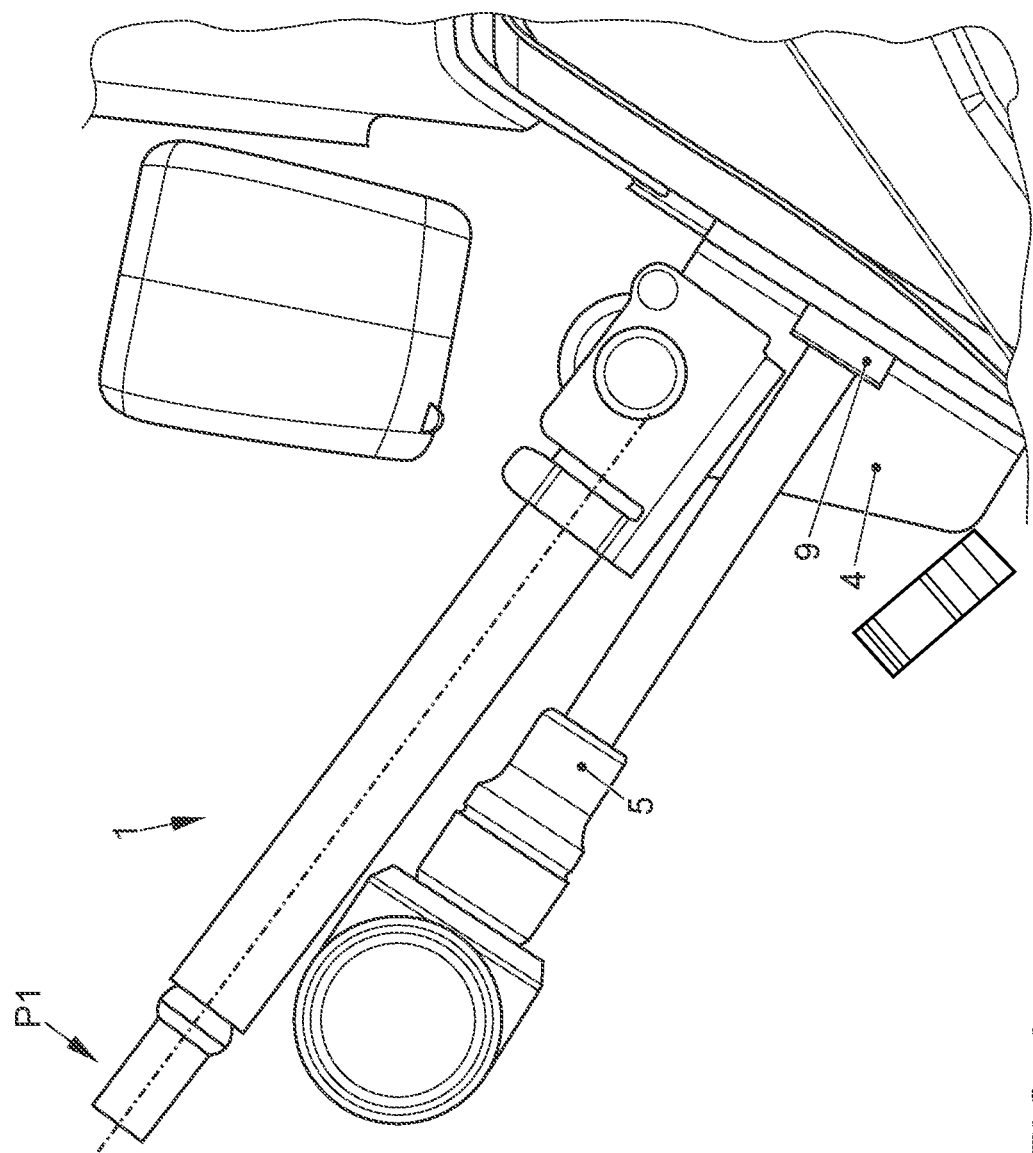
FIG. 3 illustrates a seat belt force limiter in the installation position.

In FIG. 3, the seat belt force limiter 3 is shown in its installation position P1. In this position, the installation with tools of the seat belt buckle assembly 1 is possible using the tool 5, wherein the connection of the seat belt buckle assembly 1 takes place through the fitting 4 with the aid of the fastener 9 implemented as a screw.

Figure 4:
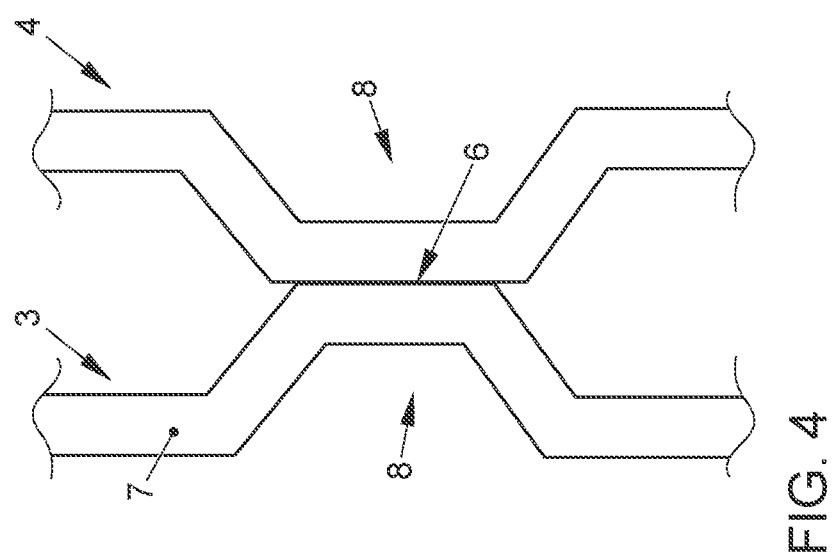
FIG. 4 is a schematic representation of a retainer assembly.

FIG. 4 schematically illustrates the production of the retainer assembly 6 by the formations 8 produced in the housing 7 of the seat belt force limiter 3 and in the fitting 4, wherein the formations 8 interact with one another, securing the seat belt force limiter 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A seat belt buckle assembly for a motor vehicle, the seat belt buckle assembly comprising:
   at least one seat belt buckle;
   a linear seat belt force limiter in operative connection with the at least one seat belt buckle; and
   a fitting via which at least the seat belt force limiter is mounted on a vehicle body of the motor vehicle,
   wherein the seat belt force limiter is pivotally connected to the fitting, such that the seat belt force limiter is pivotable, with respect to the fitting, at least between an installation position and an operating position, and wherein the installation position is a position of the seat belt force limiter during mounting of the fitting on the vehicle body.

2. The seat belt buckle assembly according to claim 1, further comprising a retainer assembly via which the seat belt force limiter is removably secured in the installation position.

3. The seat belt buckle assembly according to claim 2, wherein the retainer assembly is partially or completely removable.

4. The seat belt buckle assembly according to claim 2, wherein the retainer assembly is realized through formations implemented in the seat belt force limiter, in a housing of the seat belt force limiter, and/or in the fitting, wherein the formations interact in a securing manner with one another or with parts of the fitting or of the housing of the seat belt force limiter.

5. The seat belt buckle assembly according to claim 4, wherein the formations are deformations of the seat belt force limiter, the housing of the seat belt force limiter and/or the fitting.

6. The seat belt buckle assembly according to claim 2, wherein the retainer assembly is a bracket that is adapted to be removed nondestructively or at least partially destructively.

7. The seat belt buckle assembly according to claim 1, further comprising at least one fastener that attaches the fitting to the vehicle body, wherein in the installation position of the seat belt force limiter, the at least one fastener is accessible for installation with and/or without tools.

8. A method for installing a seat belt buckle assembly, the method comprising:
    providing the seat belt buckle assembly according to claim 1;
    mounting the seat belt buckle assembly to the vehicle body of the motor vehicle via the fitting when the seat belt force limiter is in the installation position; and
    pivoting the seat belt force limiter, with respect to the fitting, out of the installation position and into the operating position after the mounting of the seat belt buckle assembly to the vehicle body.

9. The method according to claim 8, further comprising a retainer assembly via which the seat belt force limiter is removably secured in the installation position, wherein the retainer assembly automatically detaches or is at least partially removed due to the pivoting of the seat belt force limiter out of the installation position, or wherein the retainer assembly is detached or at least partially removed before the seat belt force limiter is pivoted out of the installation position.

10. A method for installing a seat belt buckle assembly, the method comprising:
    providing the seat belt buckle assembly according to claim 1;
    mounting the seat belt buckle assembly to the vehicle body of the motor vehicle via the fitting when the seat belt force limiter is in the installation position; and
    pivoting the seat belt force limiter into the operating position after the mounting of the seat belt buckle assembly to the vehicle body,
    wherein after the seat belt force limiter is pivoted into the operating position, the seat belt force limiter is secured against pivoting by at least one lock.

11. A seat belt buckle assembly for a motor vehicle, the seat belt buckle assembly comprising:
    at least one seat belt buckle;
    a linear seat belt force limiter in operative connection with the at least one seat belt buckle; and
    a fitting via which at least the seat belt force limiter is mounted on a vehicle body of the motor vehicle,
    wherein the seat belt force limiter is arranged such that the seat belt force limiter is adapted to rotate on the fitting, and pivot at least between an installation position and an operating position, and
    wherein the seat belt buckle assembly has least one lock through which the seat belt force limiter is secured against pivoting when the seat belt force limiter is in the operating position.

* * * * *